2,990,402
PREPARATION OF 1-AMINOHYDANTOIN DERIVATIVES

David Jack, Harrow, and Gerald Sutno, Hildenborough, Tonbridge, England, assignors to Smith, Kline & French Laboratories, Ltd., London, England, a corporation of Great Britain
No Drawing. Filed Oct. 7, 1958, Ser. No. 765,914
5 Claims. (Cl. 260—240)

This invention is for improvements in or relating to the manufacture of hydantoin derivatives and has for an object to provide 1-amino-hydantoin derivatives which are useful for the preparation of the valuable antibacterial substance 1-(5'-nitro-2'-furfurylideneamino)-hydantoin.

In the past, 1-(5'-nitro-2'-furfurylideneamino)-hydantoin has been prepared by condensing 5-nitro-2-furaldehyde, or its diacetate, with 1-aminohydantoin sulphate or the hydrochloride or other soluble salt of 1-aminohydantoin in aqueous alcoholic solution, usually in the presence of mineral acid. The 1-aminohydantoin salts were prepared either according to the method of Traube and Hoffa (Ber. 31, 167) or from 2-semicarbazidoacetic acid (British Patent No. 757,822). In these syntheses, hydrazinoacetic acid or its ester is prepared from monochloroacetic acid or its ester by reaction with hydrazine. The hydrazino compound is converted to the corresponding 2-semicarbazidoacetic acid or ester by "cyanation" with sodium or potassium cyanate in slightly acid or alkaline solution. The semicarbazidoacetic acid or ester is converted to a 1-aminohydantoin salt by treatment with mineral acid. The yield obtained in this prior process is about 40% of theory when based on monochloroacetic acid or its ester, and lower than 40% when based on the hydrazine, as starting material.

According to the present invention there is provided a process for the production of derivatives of hydantoin which comprises condensing a semicarbazone with a mono-halogen substituted acetic acid ester in a substantially anhydrous solution containing an alkaline condensation agent: the alkaline condensation agent is preferably an alkali metal alkoxide such as sodium methoxide or sodium ethoxide and the reaction is preferably carried out in substantially anhydrous ethanol or methanol.

The process of the present invention results in the production of aldehyde or ketone condensation products of 1-aminohydantoin, which substances are useful intermediates for the production of the 1-aminohydantion itself and its acid salts, which compounds are capable of condensation with other aldehydes or ketones providing a high overall yield.

The invention therefore includes the hydrolysis of the condensation product of the semicarbazone with the halogen-substituted acetic acid ester by the action of a mineral acid to produce a salt of 1-aminohydantoin and further includes the reaction of the 1-aminohydantoin or its salt with 5-nitro-2-furfuraldehyde or the diacetate thereof, resulting in the production of 1-(5'-nitro-2'-furfurylideneamino)-hydantoin; the condensation product may be directly reacted with another aldehyde or ketone which displaces the original aldehyde or ketone.

Acetone semicarbazone or benzaldehyde semicarbazone are suitable semicarbazones and ethyl monochloroacetate is a suitable substituted acetic acid ester. Different derivatives of 1-aminohydantoin may be conveniently isolated from the reaction mixture, depending on the starting materials. Starting with benzaldehyde semicarbazone, the end product of the reaction is the sodium derivative of 1-(benzylideneamino)-hydantoin, free 1-(benzylideneamino)-hydantoin being obtained by acidifying the reaction mixture. With acetone semicarbazone, the end product is the sodium derivative of 1-(isopropylideneamino) - hydantoin. 1-(isopropylideneamino)-hydantoin is not readily isolated on acidification, but 1-aminohydantoin sulphate may be isolated from the reaction mixture by suitable acidification with sulphuric acid and other salts may be isolated in a similar way. Addition of benzaldehyde or other suitable aldehyde or ketone to the acidified reaction mixture yields 1-(benzylideneamino)-hydantoin or the corresponding derivative of the other aldehyde or ketone. For example, addition of 5-nitro-2-furaldehyde, or its diacetate, yields 1-(5'-nitro-2'-furfurylideneamino)-hydantoin. 1-(5'-nitro-2'-furfurylideneamino)-hydantoin may also be prepared from the isolated 1-aminohydantoin salts by condensation with 5-nitro-2-furaldehyde, or its diacetate, in acid solution, or from the aldehyde or ketone aminohydantoin condensation products by acid hydrolysis to remove the aldehyde or ketone followed by condensation with 5-nitro-2-furaldehyde, or its diacetate.

The following examples are given by way of illustration of the manner in which the invention may be carried into effect.

Example 1

16.3 g. of benzaldehyde semicarbazone was dissolved in a solution of 2.3 g. of sodium in 50 mls. of absolute ethanol with heating. To this mixture was added 6.125 g. of ethyl monochloroacetate dropwise with stirring at a rate sufficient to maintain reflux without external heating. The mixture was refluxed for 10 minutes. 1.15 g. of sodium dissolved in 25 mls. of absolute ethanol was then added followed by 3.1 g. of the chloroacetic ester as previously. The mixture was again refluxed for 10 minutes. A further 1.15 g. of sodium dissolved in 25 mls. of absolute ethanol and 3.1 g. of the chloroacetic ester were added in that order in alternate small equivalent additions refluxing briefly after each ester addition. The mixture was finally refluxed for 30 minutes. Most of the alcohol was removed by distillation and was collected under dry conditions so that it might be re-used. To the residue was added dilute hydrochloric acid until the mixture was acid to Congo red. The white solid was filtered, washed well with water and then dried at 100°–110° C. Yield 18.5 g., M.P. 228°–240° C. This material was crystallized from aqueous ethanol to yield 13.8 g. of 1-(benzylideneamino)-hydantoin M.P. 253°–254° C.

Example 2

The experiment described in Example 1 was repeated to the stage of removal of the ethanol. To the residue was added 200 mls. of a 2% by weight aqueous solution of sodium hydroxide and the mixture stirred and then filtered. The filtrate was acidified to Congo red with hydrochloric acid and the precipitated 1-(benzylideneamino)-hydantoin filtered off, washed with water and dried. Yield 15 g., M.P. 245°–250° C.

Example 3

A mixture of 2.03 g. of 1-(benzylideneamino)-hydantoin prepared according to Example 1 and 50 mls. of a 10% by volume aqueous solution of sulphuric acid was steam distilled until the distillate was free from benzaldehyde. To the residue was added 2.43 g. of 5-nitro-2-furfurylidene diacetate and 10 mls. of industrial methylated spirits. The mixture was heated with stirring at 80° C. for 30 minutes and was then cooled to room temperature. The yellow solid was filtered off, washed with aqueous ethyl alcohol (50% by weight alcohol) and then dried yielding 2.03 g. of 1-(5'-nitro-2'-furfurylideneamino)-hydantoin, M.P. 265° C. (with decomposition).

Example 4

14.5 g. of acetone semicarbazone was dissolved in a solution of 2.875 g. of sodium in 60 mls. of absolute ethanol. This solution was added to 7.66 g. of ethyl monochloroacetate at such a rate as to maintain the temperature at about 60° C. After addition was complete, the mixture was stirred for about 30 minutes and then refluxed for 5 minutes. A further 2.875 g. of sodium dissolved in 60 mls. of absolute ethanol was added followed by 7.66 g. of ethyl monochloroacetate added rapidly at about 50°-60° C. The mixture was stirred at 50°-60° C. for 1 hour and was then refluxed for 15 minutes. 60 mls. of alcohol were recovered by distillation and the mixture made acid by addition of 150 mls. of a 10% by volume aqueous solution of sulphuric acid. 30.5 g. of 5-nitro-2-furfurylidene diacetate was added and the mixture stirred at 80° C. for 30 minutes whereafter it was cooled. The yellow solid was filtered off, washed with aqueous ethanol and dried. The yield of crude 1-(5'-nitro-2'-furfurylideneamino)-hydantoin was 25.2 g., M.P. 248°-252° C. (with decomposition). Recrystallized from a mixture of equal volumes of industrial methylated spirits and dimethyl formamide there was obtained 17.8 g. of 1-(5'-nitro-2'-furfurylideneamino)-hydantoin, M.P. 266°-267° C. (with decomposition).

Example 5

10.8 g. of sodium methoxide was dissolved in 90 mls. of super-dry industrial methylated spirits with heating and in this solution was dissolved 23 g. acetone semicarbazone. The mixture was added slowly with stirring to 12.25 g. ethyl monochloroacetate, mixed with 30 mls. super-dry industrial methylated spirits, keeping the temperature at about 55°-60° C. The mixture was stirred at 55°-60° C. for 30 minutes. A further 10.8 g. of sodium methoxide dissolved in 100 mls. of super-dry industrial methylated spirits was added followed by 12.35 g. of ethyl monochloroacetate, the reaction temperature being kept at about 55°-60° C. Stirring was maintained during these additions. The mixture was then stirred at about 60° C. for 30 minutes. The reaction mixture was cooled and a mixture of 100 mls. of water and 22 g. of concentrated sulphuric acid was added with vigorous stirring. The reaction mixture was heated to about 78° C. for 5 minutes to obtain a substantially clear solution and was then cooled and stirred at about 15° C. for 1 hour. The white crystalline solid was filtered off and washed with aqueous alcohol and then dried. Yield 48.7 g. containing about 44% of 1-aminohydantoin sulphate, the remainder being chiefly sodium sulphate.

Example 6

A mixture of 12.05 g. of 5-nitro-2-furfurylidene diacetate, 70 mls. of water, 10 mls. of concentrated sulphuric acid and 50 mls. of isopropyl alcohol was refluxed for 15 minutes. To the mixture was added an equivalent amount of crude 1-aminohydantoin sulphate as obtained in Example 5 dissolved in 40 mls. of water by warming. The reaction mixture was refluxed with stirring for 30 minutes and was then cooled and stirred at about 15° C. for 1 hour. The 1-(5'-nitro-2'-furfurylideneamino)-hydantoin was filtered off, washed with aqueous alcohol and then dried. Yield 11.4 g., M.P. 268° C. (with decomposition).

What is claimed is:

1. The process for preparing hydantoin derivatives having the formula:

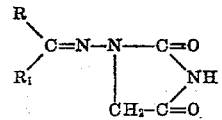

in which R represents a member of the group consisting of methyl and phenyl; and $R_1$ represents a member of the group consisting of hydrogen and methyl; which comprises reacting a semicarbazone having the formula:

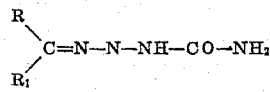

in which R and $R_1$ have the significance given above, with a monochlor acetic acid ester having the formula:

$$ClCH_2COOR_2$$

in which $R_2$ represents lower alkyl, in a medium consisting of a substantially anhydrous lower alkanol containing an alkali metal lower alkoxide and at a temperature within the range of about 50° C. and the reflux temperature of said lower alkanol, and then adding dilute mineral acid to said medium.

2. The process for preparing 1-(benzylideneamino)-hydantoin which comprises reacting benzaldehyde semicarbazone with a monochlor acetic acid ester having the formula:

$$ClCH_2COOR_2$$

in which $R_2$ represents lower alkyl, in a medium consisting of a substantially anhydrous lower alkanol containing an alkali metal lower alkoxide and at a temperature within the range of about 50° C. and the reflux temperature of said lower alkanol, and then adding dilute mineral acid to said medium.

3. The process according to claim 2 in which the monochlor acetic acid ester is ethyl monochloracetate.

4. The process for preparing 1-(isopropylideneamino)-hydantoin which comprises reacting acetone semicarbazone with a monochlor acetic acid ester having the formula:

$$ClCH_2COOR_2$$

in which $R_2$ represents lower alkyl, in a medium consisting of a substantially anhydrous lower alkanol containing an alkali metal lower alkoxide and at a temperature within the range of about 50° C. and the reflux temperature of said lower alkanol, and then adding dilute mineral acid to said medium.

5. The process according to claim 4 in which the monochlor acetic acid ester is ethyl monochloracetate.

References Cited in the file of this patent

UNITED STATES PATENTS

| | | |
|---|---|---|
| 2,921,941 | Coker et al. | Jan. 19, 1960 |

FOREIGN PATENTS

| | | |
|---|---|---|
| 1,103,106 | France | May 18, 1955 |